May 29, 1962 A. H. FREEMAN 3,036,708
PARTICULATE MATERIAL SEPARATOR
Filed Aug. 4, 1959 2 Sheets-Sheet 1

INVENTOR.
ARDEE HORACE FREEMAN
BY
Bean, Brooks, Buckley & Bean
ATTORNEYS

May 29, 1962 A. H. FREEMAN 3,036,708
PARTICULATE MATERIAL SEPARATOR
Filed Aug. 4, 1959 2 Sheets-Sheet 2

INVENTOR.
ARDEE HORACE FREEMAN
BY
Bean, Brooks, Buckley & Bean
ATTORNEYS

United States Patent Office 3,036,708
Patented May 29, 1962

3,036,708
PARTICULATE MATERIAL SEPARATOR
Ardee Horace Freeman, Granger, Ind., assignor, by mesne assignments, to Bell Intercontinental Corporation, South Bend, Ind., a corporation of Delaware
Filed Aug. 4, 1959, Ser. No. 831,525
11 Claims. (Cl. 209—134)

This invention relates to an improved device for separating particulate materials, such as dust from abrasive granules; and more particularly to an improved device for abstracting fine contaminants from reusable blast media, such as shot, grit, abrasive granules and the like.

Blast media such as used in surface finishing or cleaning processes on forgings, castings, or other such items are propelled at the work pieces at high velocity, and the blast media gradually breaks down into fine particles such as are no longer efficient for abrasive purposes. Also, incidental to such operations, foreign matters such as sand, scale, rust and dust are removed from the items being processed and become intermixed with the abrasive. The machine of the present invention is particularly adapted to separate reusable abrasive particles from mixtures thereof with undesirably fine abrasive dust and other foreign matter.

Thus, it is an object of the present invention to provide an improved separator for classifying mixtures as aforesaid by passing them across an air stream.

Another object is to provide a separator as aforesaid which employs an air stream for separating reusable abrasive from mixtures thereof with contaminants; the device being self-adjusting to optimum operating conditions.

Another object is to provide a device as aforesaid which is of compact structural form, and which has a high flow capacity, and which provides at all times an accurately adjusted uniform air flow pattern.

Another object is to provide a device as aforesaid which is not subject to blockages of the abrasive media flow, and which is otherwise foolproof in operation.

Other objects and advantages of the invention will appear from the specification hereinafter wherein.

Figure 1:
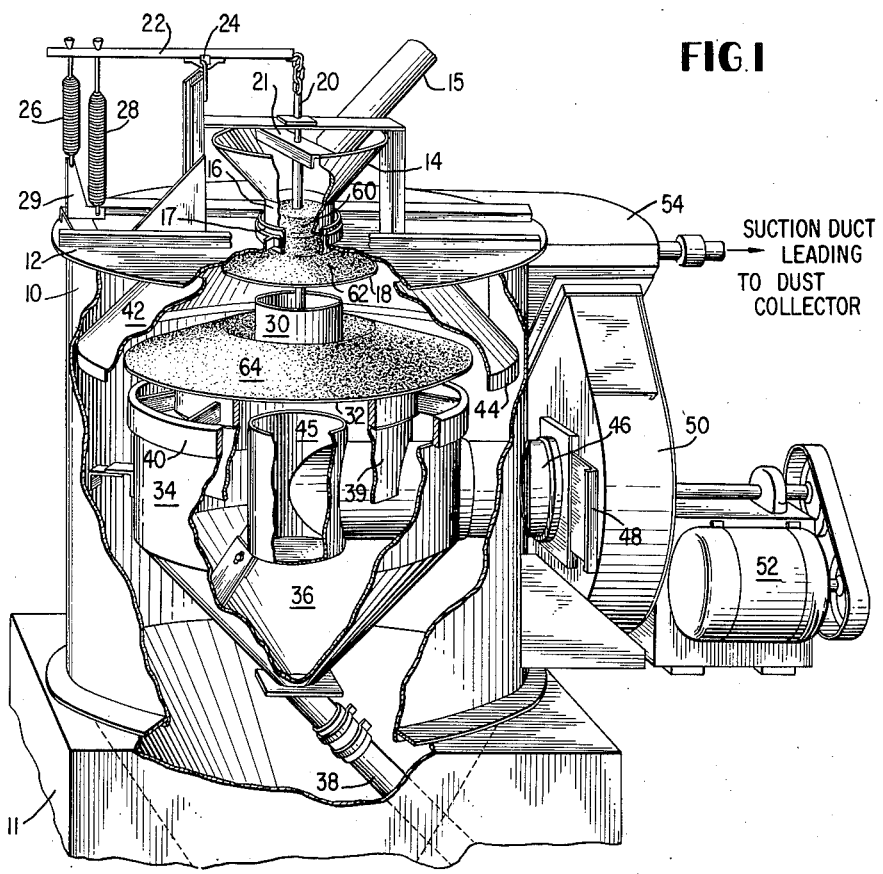
FIG. 1 is a perspective view of a machine of the invention with portions broken away to show the interior; the material feed being shut off and the machine being shown in non-operating condition.

As shown in the drawing herewith, a machine of the invention may be constructed to comprise an outer casing 10 which is of generally cylindrical form mounted upon a support base 11 and closed at its upper end by means of a top cover plate 12. A feed hopper 14 is disposed at the top center of the machine to receive from a continuously running elevator or metering conveyor or the like, the supply of mixed material to be separated, as through a delivery spout 15. The hopper 14 includes a cylindrical conduit portion 16 leading downwardly into the interior of the casing 10, and is circumscribed by a vertically adjustable but normally stationary control collar 17.

To assist in the control of flow of mixed material into the machine, a feed control disc as indicated at 18 (FIGS. 2, 3, 4) is disposed horizontally inside the machine and is suspended therein by means of a vertical control rod 20 which also mounts the hopper structure 14 and conduit 16 as by means of a cross bracket 21. At its upper end the control rod 20 pivotally connects with a rocker arm 22 which is fulcrumed as indicated at 24 upon a stationary bracket device; and tension springs 26, 28 are coupled to the outer end of the arm 22 so as to counterbalance the latter and the weight of the hopper and disc and the load of mixed material on the control disc 18, as will be explained more in detail hereinafter. The springs 26, 28 connect to a bracket 29 which extends from the top cover plate 12.

Interiorly of the machine and directly beneath the control disc 18 is disposed a cylindrical sleeve 30 which extends vertically from a horizontally disposed distributor plate 32 (FIG. 2) of circular form. The perimentral edge of the plate 32 complements the top edge of a cylindrical housing 34 which extends downwardly into a conical shaped hopper portion 36 for delivering segregated material to a delivery spout 38, as will be explained more fully hereinafter. Interiorly of and mounted concentrically with the cylindrical housing 34 is a cylindrical baffle 39 (FIG. 1), thus defining therebetween an annular vertically directed passageway. At its upper edge, the housing 34 is provided with a rim 40, which may or may not be vertically adjustable as preferred. A conically shaped canopy 42 is disposed interiorly of the casing 10 to substantially enclose the upper portion of the device, and is formed at its lower edge with a downwardly extending flange 44, to guide the direction of air flow within the machine, as will be explained hereinafter.

Interiorly of the housing 34 and the collar 39 is disposed an air intake pot 45 having a side wall opening connecting with a duct 46 controlled by a valve plate 48 and leading to the intake port of a centrifugal fan 50; the fan being arranged to be driven by a motor and drive unit as indicated at 52. The outlet port of the fan is disposed as indicated at 54 to deliver air in a circular path interiorly of the casing 10 around the upper level thereof above the canopy 42. Thus, as the fan operates, the flow of air interiorly of the machine will be directed as indicated by the arrows in FIG. 2 herein; the air from the fan being directed first to flow around the canopy 42 and thence inwardly and down into the annular space between the disc 32 and the vertical rim 40. The flow passes thence downwardy inside the annular passageway between the housing 34 and the baffle 39, and thence in reverse direction upwardly inside of the baffle and then over and inwardly into and downwardly through the interior of the pot 45. It then travels laterally through the duct 46 into the fan again, to be recirculated as described hereinabove.

Figure 3:
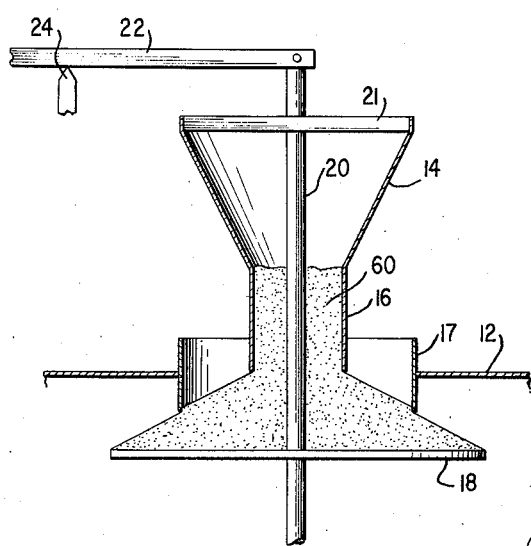
FIGS. 3, 4, are schematic illustrations corresponding to FIGS. 1, 2, respectively.
Figure 2:
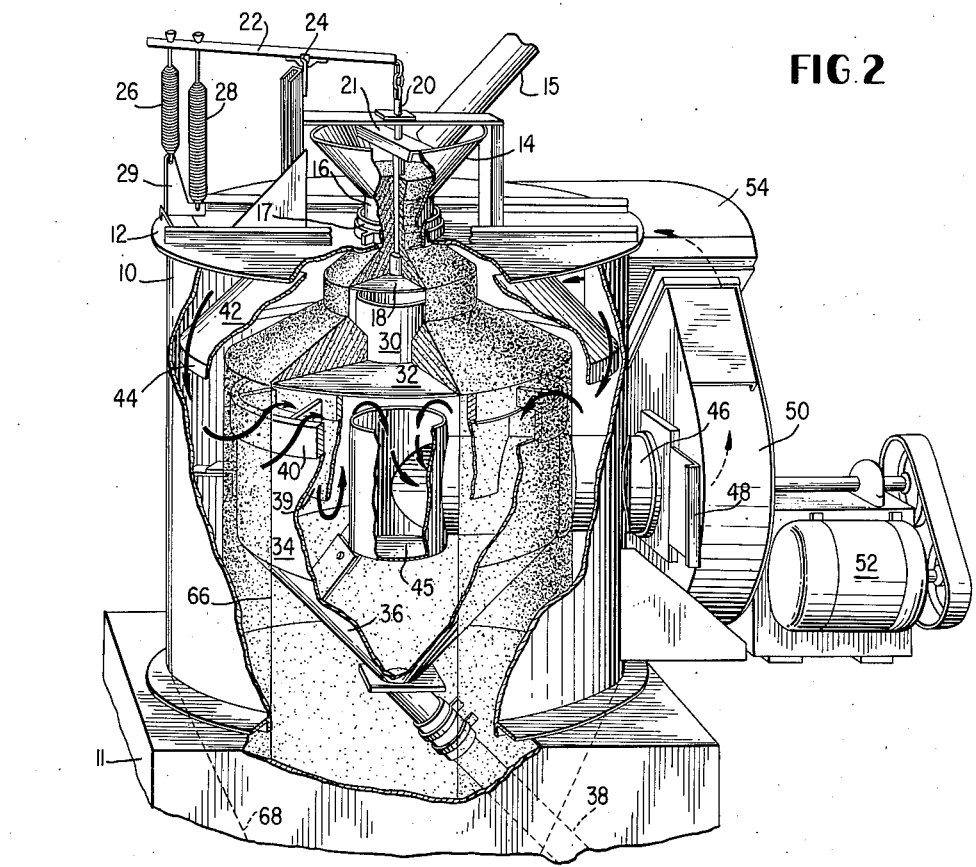
FIG. 2 is a view corresponding to FIG. 1 but showing the machine in operating condition.
Figure 4:
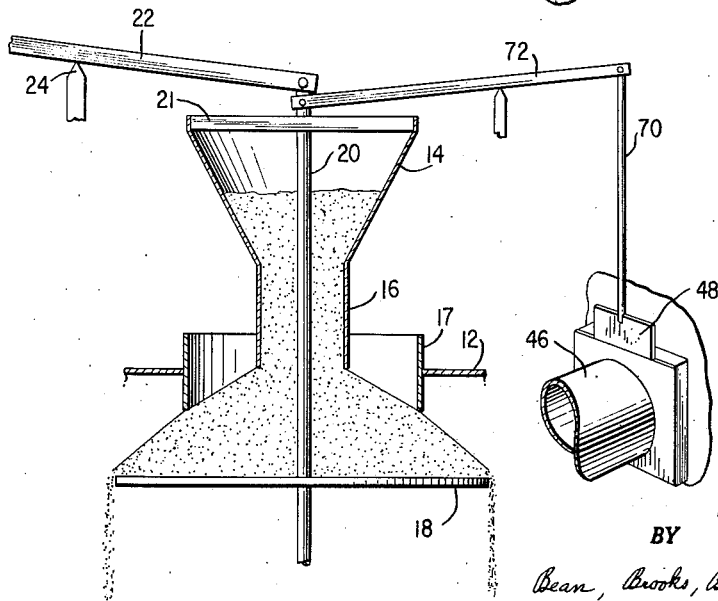

As explained hereinabove, the mixed material to be sorted by the machine is delivered through the spout 15 into the hopper 14, and thereupon flows downwardly through the conduit 16 in the form of a vertical column of material as indicated at 60 (FIG. 1). This material then gravity-flows down upon the control disc 18 whereupon it assumes its natural angle of repose as indicated at 62 which initially is controlled by the collar 17 as shown in FIGS. 1, 3, so as to prevent spillage over the edge of the disc 18. However, as the material load in the conduit 16 and hopper 14 builds up as shown in FIG. 4, the increased weight thereof overcomes the force of the counterbalance spring system and causes the assembly including the rod 20; the hopper 14; the conduit 16; and the disc 18 to displace downwardly. This increases the vertical dimension of the gap between the disc 18 and the bottom edge of the collar 17 (which is stationary) whereby more material is now able to flow out of the conduit 16 and over the edge of the disc 18, as shown in FIGS. 2, 4, and thence down upon the plate 32. The material now builds up on the plate 32 to its natural angle of repose as indicated at 64 in the drawing whereupon it runs off the perimetral edge of the plate 32 in the form of a thinly divided curtain of material as indicated at 66. Gravity forces direct the material to flow downwardly outside of the housing 34 and thence into the hoppered interior 68 of the base 11. However, when the fan 50 is in operation the material falling from the edge of the plate 32 is subjected to a screening action resulting from the passage of air currents through the opening defined by the edge of the plate 32 and the top of the rim 40. This flow of air carries with it the fine particles of the material mix which thereupon pass inwardly and downwardly through the annular passageway defined between the housing 34 and the baffle 39. When the air currents reach the bottom of the baffle and reverse in direction to move upwardly inside the baffle and toward the inlet end of the pot 45, the relatively heavy contaminant particles entrained in the air stream fall into the delivery spout 38.

Thus it will be appreciated that by virtue of the feed control arrangement of the present invention material will not be fed to the separating air stream until a sufficient quantity of material accumulates in the conduit 16 such as to insure an even distribution of material around the entire periphery of the disc 32. By virtue of the arrangement which mounts the hopper 14 and plate 18, this unit "floats" up and down during operation of the mechanism, and thereby compensates automatically for minor load surges or the like, and insures at all times an evenly distributed curtain of falling material around the rim of disc 18 and thereby around the rim of plate 32. Thus, regardless of the rate of material in-feed a curtain of material of uniform thickness flows across the air separating gap of the machine at all points around the periphery of the gap. This eliminates the possibility of higher rate air flow patterns through less dense portions of the material curtain, and relatively slow rate air flow patterns through denser portions thereof; thereby insuring uniform separation characteristics and a highly efficient operation.

Whereas in the example shown, the separation air flow is provided by means of a closed circuit system including an integrally mounted fan, whereby the major portion of the air is recycled, it should be understood that in lieu thereof any other suitable means for creating air flow through the machine may be employed. For example, the fan 50 may be omitted and duct 46 may instead be coupled to a suction duct leading directly to a dust collector. In such case an air inlet opening would be provided in the region of 54, said opening being preferably covered by a screen to keep foreign materials from being sucked into the system. In any case, it may also be preferred to interconnect the duct control valve 48 by means of a rod 70 and fulcrumed lever 72 (FIG. 4) to the control rod 20, so that the rate of air flow through the system automatically varies in proportion to abrasive curtain thickness changes.

Thus, by virtue of the present invention the need of any rotary material spreading apparatus, such as for example in centrifugal type separators, is eliminated. This greatly minimizes the mechanical and structural problems of such apparatus and furthermore minimizes the problems of machine adjustments and abrasion deterioration of machine parts, while at the same time providing improved machine capacity-to-size ratio.

It will of course be understood that although only one form of a machine of the invention has been illustrated and described in detail herein, various changes may be made therein without departing from the spirit of the invention or the scope of the following claims.

What is claimed is:

1. A particulate material separator including an outer casing having an in-feed opening through the top center portion thereof, a control disc disposed horizontally below said opening and of a larger diameter than such opening, a feed hopper discharging through said opening and fixed to said control disc in spaced relation thereabove, counterbalance means supporting said hopper and biasing said disc toward said opening and adapted to be overcome by the weight of accumulation in said hopper and on said disc of a predetermined supply of material, a distributor plate of circular form and of larger diameter than said control disc disposed horizontally in spaced relation below said control disc, a cylindrical housing having an upper open rim portion disposed in spaced parallel relation to and below the peripheral edge of said plate and aligned therewith thereby defining therebetween an annular air gap, a cylindrical baffle disposed interiorly of said housing and extending downwardly from said distributor plate thereby defining in cooperation with said housing wall a downwardly directed annular air passageway, an air intake duct having its inlet opening disposed inside said baffle at an elevation above the lower edge thereof, a suction fan having its inlet port connected in communication with said duct and its outlet port connected in communication with the interior of said casing at the upper portion thereof, said housing terminating downwardly in a hopper device leading to a separated fine material outlet, the bottom portion of said casing being hoppered and leading to a separated coarse material outlet.

2. A particulate material separator including an outer casing having an in-feed opening in the top center portion thereof, a control disc of larger diameter than such opening disposed horizontally below said opening, counterbalance means biasing said disc toward said opening and adapted to be overcome by accumulation on said disc of a supply of material exceeding the material required to assume the natural angle of repose of said material on said disc, a circular distributor plate of larger diameter than said control disc disposed horizontally in spaced relation below said control disc, a cylindrical housing having an upper open rim portion disposed in aligned spaced parallel relation below the peripheral edge of said plate thereby defining therebetween an annular air gap, an air intake duct having its inlet opening disposed inside said housing, and a suction fan having its inlet port connected in communication with said duct.

3. A particulate material separator including an outer casing having an in-feed opening into the top portion thereof, a material flow control member disposed horizontally below said opening and of larger diameter than said opening, counterbalance means biasing said member toward said opening, a distributor plate disposed horizontally in spaced relation below said control member and having a plan view shape of larger size than said control member but similar thereto, a housing having an upper open rim portion disposed in aligned spaced parallel relation below the peripheral edge of said plate thereby defining therebetween an air gap, and air displacement means in airflow communication with the interior of said casing for causing air to flow through said gap.

4. A particulate material separator including a vertically directed material feed conduit having a discharge opening, a control disc of larger diameter than said discharge opening and disposed horizontally below said discharge opening, counterbalance means biasing said disc toward conduit closing position and adapted to be overcome by accumulation on said disc of a supply of material exceeding the material required to assume the natural angle of repose of said material on said disc, a distributor plate of circular form of larger diameter than said control disc and disposed horizontally in spaced relation below said control disc, a cylindrical housing having an upper open rim portion disposed in aligned spaced parallel relation below the peripheral edge of said plate thereby defining therebetween an annular air gap, and air displacement means in airflow communication with the interior of said casing for causing air to flow through said gap.

5. A particulate material separator including an outer casing having a circular vertically directed in-feed opening through the top center portion thereof, a control disc of larger diameter than said opening and disposed horizontally therebelow, a feed hopper discharging into said opening and connected to said disc in spaced relation thereabove, counterbalance means biasing said disc toward said opening and adapted to be overcome by the weight of accumulation in said hopper and on said disc of a supply of material exceeding a predetermined volume, a distributor plate of circular form and larger diameter than said control disc and disposed horizontally in spaced relation therebelow, a cylindrical housing having an upper open rim portion disposed in aligned spaced parallel relation below the peripheral edge of said plate thereby defining therebetween an annular air gap, and air circulation means connected to cause air to flow through said air gap for separation of the ingredients of the feed material.

6. A particulate material separator including an outer casing having an in-feed opening through the top portion thereof, a control disc of circular plan form and of larger diameter than said opening and disposed horizontally, a feed hopper discharging into said opening and therebelow fixed to said control disc in spaced relation thereabove, counterbalance means supporting said hopper and disc and biasing said disc toward said opening and adapted to be overcome by the weight of accumulation in said hopper and on said disc of a predetermined supply of material, a distributor plate of circular plan form and larger in diameter than said control disc disposed horizontally in spaced relation below said control disc, a cylindrical housing having an upper open rim portion disposed in aligned spaced parallel relation below the peripheral edge of said plate thereby defining therebetween an annular air gap, an air intake duct having its inlet opening disposed within said housing, and air circulation conduit means connected in communication with said duct, said housing terminating downwardly in a hopper device leading to a separated fine material outlet, the bottom portion of said casing being hoppered and leading to a separated coarse material outlet.

7. A particulate material separator including an outer casing having an in-feed opening through the top portion thereof, a control disc of larger diameter than said opening and disposed horizontally therebelow, counterbalance means biasing said disc toward said opening, a distributor plate of circular form and of a larger diameter than said control disc and disposed horizontally in spaced relation therebelow, a cylindrical housing having an upper open rim portion disposed in aligned spaced parallel relation below the peripheral edge of said plate thereby defining therebetween an annular air gap, a baffle disposed interiorly of said housing and extending downwardly from said plate thereby defining in cooperation with said housing wall a downwardly directed air passageway, an air circulating duct opening into said passageway, fan means connected into said duct and also in communication with the interior of said casing, said housing terminating downwardly in a hopper device leading to a separated fine material outlet, the bottom portion of said casing being hoppered and leading to a separated coarse material outlet.

8. A particulate material separator including an outer casing having a stationary downwardly directed discharge collar fixed to the top center portion thereof to define an in-feed opening, a control disc of larger diameter than said opening and disposed in spaced position horizontally below said collar, counterbalance means biasing said disc toward said collar, a distributor plate of circular form and of a diameter larger than said control disc disposed horizontally in spaced relation below said control disc, a cylindrical housing having an upper open rim portion disposed in aligned spaced parallel relation below the peripheral edge of said plate thereby defining therebetween an annular air gap, an air intake duct having its inlet opening disposed inside said housing, and a suction fan having its inlet port connected in communication with said duct.

9. A particulate material separator comprising an outer casing having a stationary gravity discharge collar fixed to the top portion thereof and defining an in-feed opening thereat, a control member disposed horizontally below said collar and vertically movable in relation thereto to control material flow therethrough, said control member being of larger area than said in-feed opening, counterbalance means biasing said control member toward said collar, a distributor plate disposed horizontally in spaced relation below said control member and having a plan view shape larger than that similar thereto, a housing having an opening disposed in aligned spaced relation with the peripheral edge of said plate thereby defining therebetween an air gap, and air displacement means in airflow communication with the interior of said casing for causing air to flow through said gap.

10. A particulate material separator including a stationary vertically directed material feed conduit, a feed hopper discharging into said conduit, a control disc disposed horizontally below the discharge end of said conduit and of larger diameter than the conduit, counterbalance means movably supporting said hopper and said disc and biasing said disc toward conduit closing position, a distributor plate of larger diameter than said control disc and disposed horizontally in spaced relation therebelow, a cylindrical housing having a rim portion disposed in aligned spaced relation to said plate thereby defining therebetween an annular air gap, and means in communication with the interior of said housing for causing air to flow through said gap.

11. In a particulate material separator including an outer casing and a cylindrical inner housing having an open top, a distributor plate disposed in spaced relation to the open top of said housing and of an area complementing the top of said housing to define a peripheral air gap therebetween, means for delivering particulate material to said plate, and means for establishing air flow through said gap from said casing into said housing whereby to effect material separation within a curtain of particulate material cascading peripherally from said distributor plate, the improvement consisting in means for effecting peripheral uniformity in such curtain of particulate material, the last means including a substantially flat, horizontally disposed control disc disposed in spaced relation above said plate, said means for delivering particulate material discharging to said disc, said disc being of similar shape but of smaller size than said distributor plate and disposed concentrically thereabove whereby uniform peripheral discharge from said disc will effect uniform delivery of material to said distributor plate along a line concentric with the periphery of the distributor plate, a baffle disposed in spaced concentricity above said disc, said baffle being of a size smaller than said disc and normally spaced therefrom a distance no greater than that spacing establishing the natural angle of repose of the particulate material between the baffle and the periphery of the disc, said disc and baffle being relatively movable to increase said spacing in response to the weight of a quantity of particulate material in excess of that necessary to establish the natural angle of repose on said disc, whereby the disc discharges with peripheral uniformity to said plate.

References Cited in the file of this patent

UNITED STATES PATENTS

| | | |
|---|---|---|
| 192,707 | Moir | July 3, 1877 |
| 1,272,515 | Peck | July 16, 1918 |
| 1,274,114 | Warren | July 30, 1918 |
| 1,914,862 | Menk | June 20, 1933 |
| 2,866,547 | Gladfelter | Dec. 30, 1958 |

UNITED STATES PATENT OFFICE
CERTIFICATE OF CORRECTION

Patent No. 3,036,708

May 29, 1962

Ardee Horace Freeman

It is hereby certified that error appears in the above numbered patent requiring correction and that the said Letters Patent should read as corrected below.

Column 5, lines 18 and 19, after "horizontally" insert -- therebelow --; line 20, before "fixed" strike out "therebelow"; column 6, line 30, after "and" insert -- air displacement --.

Signed and sealed this 20th day of November 1962.

(SEAL)
Attest:

ERNEST W. SWIDER
Attesting Officer

DAVID L. LADD
Commissioner of Patents